(12) United States Patent
Arno

(10) Patent No.: US 10,965,212 B2
(45) Date of Patent: Mar. 30, 2021

(54) SWITCHED-MODE POWER SUPPLY WITH BYPASS MODE

(71) Applicant: STMicroelectronics (Alps) SAS, Grenoble (FR)

(72) Inventor: Patrik Arno, Sassenage (FR)

(73) Assignee: STMICROELECTRONICS (ALPS) SAS, Grenoble (FR)

( * ) Notice: Subject to any disclaimer, the term of this patent is extended or adjusted under 35 U.S.C. 154(b) by 0 days.

(21) Appl. No.: 16/385,214

(22) Filed: Apr. 16, 2019

(65) Prior Publication Data

US 2019/0319540 A1 Oct. 17, 2019

(30) Foreign Application Priority Data

Apr. 17, 2018 (FR) ........................................ 1853364
Apr. 17, 2018 (FR) ........................................ 1853366

(51) Int. Cl.
*H02M 3/156* (2006.01)

(52) U.S. Cl.
CPC ................... *H02M 3/156* (2013.01)

(58) Field of Classification Search
CPC ......... H02M 2001/0025; H02M 3/156; H02M 3/157; H02M 3/1582; H02M 1/32; H02M 3/158
See application file for complete search history.

(56) References Cited

U.S. PATENT DOCUMENTS

| 4,185,251 A * | 1/1980 | Brown, Jr. ................. G01S 7/34 330/110 |
| 5,627,460 A * | 5/1997 | Bazinet ................... G05F 1/618 323/224 |
| 5,919,262 A | 7/1999 | Kikinis et al. |
| 2004/0032293 A1 | 2/2004 | Maigret et al. |
| 2006/0176098 A1 | 8/2006 | Chen et al. |
| 2007/0176636 A1 * | 8/2007 | Liu ....................... H02M 3/156 326/81 |
| 2008/0067987 A1 | 3/2008 | Tung et al. |
| 2009/0102440 A1 | 4/2009 | Coles |
| 2010/0001703 A1 * | 1/2010 | Williams ............ H02M 3/1584 323/283 |
| 2013/0021009 A1 * | 1/2013 | Waltman ............. H02M 3/1584 323/271 |
| 2013/0169248 A1 | 7/2013 | Zhang et al. |
| 2014/0009130 A1 | 1/2014 | Galbis et al. |

(Continued)

FOREIGN PATENT DOCUMENTS

| CN | 103151926 A | 6/2013 |
| CN | 104049662 A | 9/2014 |

(Continued)

OTHER PUBLICATIONS

National Semiconductor, "LM2706 Miniature, Variable, Step-Down DC-DC Converter with Bypass for RF Power Amplifiers", XP055530782, Feb. 28, 2004, 15 pages.

(Continued)

*Primary Examiner* — Alex Torres-Rivera
(74) *Attorney, Agent, or Firm* — Slater Matsil, LLP

(57) ABSTRACT

In an embodiment, an SMPS comprises a half-bridge, and a driver configured to drive the half-bridge based on a PWM signal. The SMPS further comprising a first circuit coupled between the output of the driver and a control terminal of a high-side transistor of the half-bridge, wherein the first circuit is configured to maintain the first transistor on when the PWM signal has a duty cycle that is substantially 100%.

25 Claims, 7 Drawing Sheets

(56) References Cited

U.S. PATENT DOCUMENTS

| | | | | |
|---|---|---|---|---|
| 2014/0062449 A1* | 3/2014 | Qu | ............................. | G05F 3/02 |
| | | | | 323/311 |
| 2014/0152284 A1 | 6/2014 | Rozek | | |
| 2014/0266118 A1* | 9/2014 | Chern | ................... | H02M 3/156 |
| | | | | 323/283 |
| 2015/0180335 A1* | 6/2015 | Takada | .................. | H02M 3/156 |
| | | | | 323/288 |
| 2015/0249382 A1 | 9/2015 | Pignolo | | |
| 2017/0147019 A1 | 5/2017 | Kim | | |

FOREIGN PATENT DOCUMENTS

| | | |
|---|---|---|
| CN | 105305818 A | 2/2016 |
| CN | 210093111 U | 2/2020 |

OTHER PUBLICATIONS

Texas Instruments, "LM3242 6MHz, 750mA Miniature, Adjustable, Step-Down DC-DC Converter with Auto Bypass for RF Power Amplifiers", SNOSB48D—Oct. 2011—Revised Mar. 2013, 27 pages.

Linear Technology Corporation, "60v Low IQ Step-Down DC/DC Controller with 100% Duty Cycle capability", LTC3864, www.linear.com/LTC3864, Revision A, Jun. 14, 2012, 30 pages.

Maxim Integrated, "24V Internal Switch, 100% Duty Cycle, Step-Down Converters", MAX1836/MAX1837, Rev. 3, Jul. 2006, 15 pages.

Zhao, Lingyun et al., "DC-DC Power Conversions and System Design Considerations for Battery Operated System", ResearchGate, Jan. 2006, 18 pages.

* cited by examiner

SWITCHED-MODE POWER SUPPLY WITH BYPASS MODE

CROSS-REFERENCE TO RELATED APPLICATIONS

This application claims priority to French Patent Application No. 1853366, filed on Apr. 17, 2018, and to French Patent Application No. 1853364, filed on Apr. 17, 2018, both applications are hereby incorporated herein by reference.

TECHNICAL FIELD

The present disclosure concerns generally to an electronic system and method, and, in particular embodiments, to switched-mode power supplies.

BACKGROUND

Switched-mode power supplies are DC/DC converters which incorporate one or more switching elements. Like other types of power supplies, switched-mode power supplied transfer a power supplied by a source DC to a load, and doing so, modify one of the current or voltage characteristics.

SUMMARY

Some embodiments relate to switched-mode power supplies and their operating modes.

An embodiment provides a switched-mode power supply wherein the reference voltage of the feedback loop has an adjustable value.

According to an embodiment, the power supply is a buck converter, the reference voltage being capable of taking a value greater than or equal to the value of the power supply voltage divided by the closed loop gain of the system.

According to an embodiment, the power supply is a boost converter, the reference voltage being capable of taking a value smaller than or equal to the value of the power supply voltage divided by the closed loop gain of the system.

According to an embodiment, the power supply comprises first and second series-connected transistors, the first transistor being connected between the ground and a first node and the second transistor being connected between the first node and a node of application of the power supply voltage, the first and second transistors being capable of being controlled by a circuit for generating the control signals of the first and second transistors.

According to an embodiment, the power supply comprises a first circuit capable of detecting whether the duty cycle of an input signal of the generation circuit is substantially equal to 100%.

According to an embodiment, the power supply comprises a second circuit capable of maintaining the second transistor on if the duty cycle of the input signal of the generation circuit is substantially equal to 100%.

According to an embodiment, the second circuit comprises an AND gate.

According to an embodiment, the first circuit comprises a counter having its reset input connected to the input signal of the generation circuit.

According to an embodiment, the feedback loop is located between the output node of the power supply and a second node.

According to an embodiment, the second node is coupled to ground by a first resistor, the second node being coupled to the output node by a second resistor.

According to an embodiment, the reference voltage is supplied by a third circuit comprising a resistive feedback loop having an adjustable resistance.

According to an embodiment, the reference voltage is supplied by a third circuit comprising a resistive feedback loop having its output coupled to the output of the circuit by a resistive block having an adjustable resistance.

An embodiment provides a method of using a power supply comprising switching from a first state of the reference voltage of the feedback loop to a second state.

According to an embodiment, the power supply is a buck converter, and the reference voltage in the second state is greater than or equal to the power supply voltage divided by the closed loop gain of the system.

According to an embodiment, the power supply is a boost converter, and the reference voltage in the second state is smaller than or equal to a power supply voltage divided by the closed loop gain of the system.

According to an embodiment, the method comprises: determining, by using a first circuit, whether the duty cycle of an input signal of the circuit for generating the control signals of two transistors is substantially equal to 100%; and turning off the components of the power supply other than a second circuit ensuring the connection between the power supply output and a node of application of the power supply voltage.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
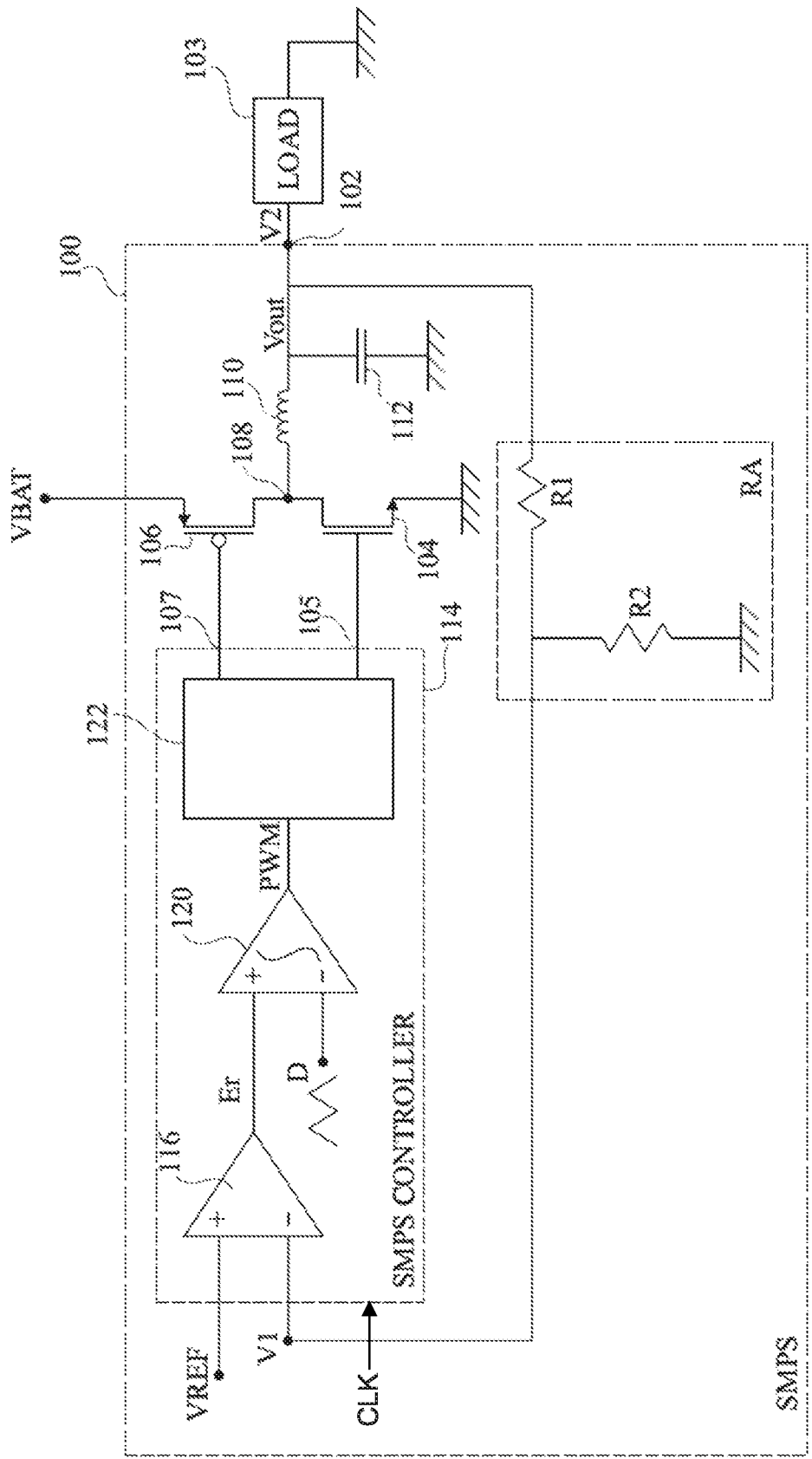
FIG. 1 is a simplified representation of an example of a switched-mode power supply.

The same elements have been designated with the same reference numerals in the various drawings and, further, the various drawings are not to scale. For clarity, only those steps and elements which are useful to the understanding of the described embodiments have been shown and are detailed.

In the following description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred to the orientation of the concerned elements in the drawings. Unless otherwise specified, the terms "approximately," "substantially," and "in the order of" are used herein to designate a tolerance of plus or minus 10%, preferably of plus or minus 5%, of the value in question.

FIG. 1 is a simplified representation of an example of switched-mode power supply 100 (SMPS) receiving as an input a power supply voltage VBAT and a reference voltage VREF and supplying a voltage Vout to an output node 102 (V2). The power supply of FIG. 1 is a buck converter, that is, voltage Vout is smaller than power supply voltage VBAT. Output node 102 is coupled to ground by a load 103 (LOAD). Load 103 is thus powered by converter 100.

Converter 100 comprises two switches 104 and 106 series connected between the node of application of power supply voltage VBAT and the ground. In the example of FIG. 1, switch 104 is an N-channel metal-oxide-semiconductor (MOS) transistor and switch 106 is a P-channel MOS transistor. The source of transistor 106 is connected to a node 108 and its drain is connected to the node of application of voltage VBAT. The source of transistor 104 is connected to ground and its drain is connected to node 108. An inductance no is connected between nodes 108 and 102. Node 102 is further coupled to ground by a capacitor 112.

Transistors 104 and 106 are controlled by a control circuit 114 (SMPS CONTROLLER). More particularly, transistor 106 is controlled by an output 107 of control circuit 114, and transistor 104 is controlled by an output 105 of control circuit 114. Control circuit 114 comprises a comparator 116, for example, an error amplifier. The inputs of comparator 116 are connected to a node of application of reference voltage VREF and to a node V1. The output of comparator 116 supplies a signal Er, representative of the voltage difference between reference voltage VREF and the voltage of node V1.

Node V1 is coupled to output node 102 by a resistive block RA. Power supply 100 thus comprises a resistive feedback loop between output node 102 and node V1. "Feedback voltage" designates the voltage of node V1, that is, the input voltage of the control circuit depending on output voltage Vout.

Block RA comprises for example two resistors, a resistor R1 connected between nodes 102 and V1 and a resistor R2 connected between node V1 and the ground.

Control circuit 114 further comprises a comparator 120 receiving as an input signal Er and a periodic sawtooth signal D. Comparator 120 outputs a pulse-width modulated signal PWM. Signal PWM is a periodic binary signal comprising a high state and a low state. The duty cycle of signal PWM is controlled by signal Er. Thus, the larger the difference between reference voltage VREF and the feedback voltage, that is, signal Er, the larger the duty cycle of signal PWM.

Control circuit 114 further comprises driver 122 for generating the control signals of transistors 104 and 106. More particularly, when signal PWM is in the high state, driver 122 turns on switch 106 and turns off switch 104 and when signal PWM is in the low state, driver 122 turns off switch 106 and turns on switch 104.

Under certain conditions, for example when the power supplied by the power source is not sufficiently high (is for example smaller than 5 W), the use of a switched-mode power supply such as power supply 100 may be neither cost-effective nor efficient.

It may then be desired for output node 102 of the switched-mode power supply to directly and continuously receive the power supplied by the power source. Such an operating mode is called bypass mode. It could be envisaged to simply connect, for example, by using a switch, the source of application of voltage VBAT to node 102. However, the turning on of this switch may cause a current peak on node 102. Such a current peak may risk damaging certain elements of power supply 100, for example, switches connecting two nodes or a power source and a node.

Figure 2:
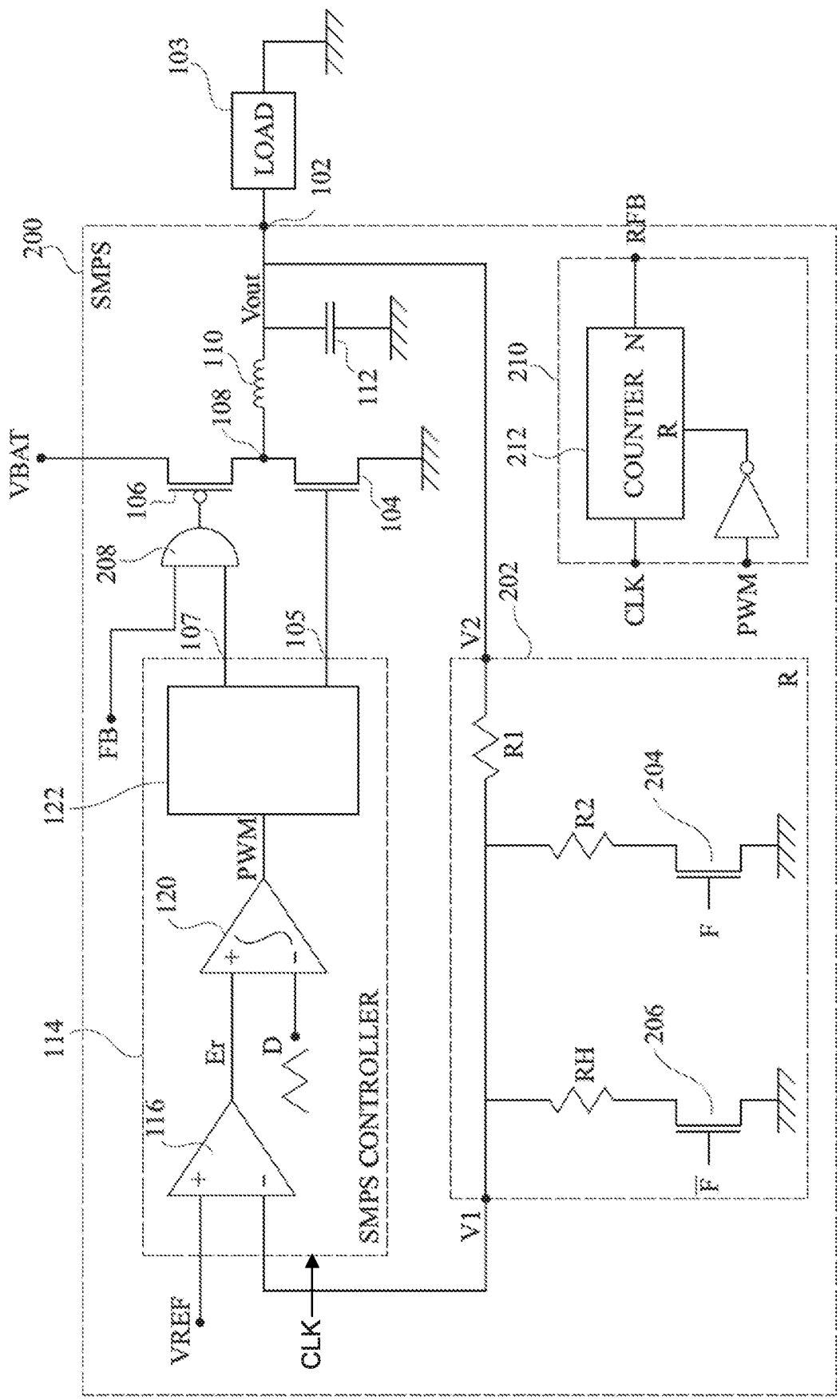
FIG. 2 is a simplified representation of an embodiment of a switched-mode power supply.

FIG. 2 is a simplified representation of an embodiment of a switched-mode power supply 200 powering load 103 and receiving power supply voltage VBAT. Power supply 200 is, like power supply 100 of FIG. 1, a buck converter. Power supply 200 comprises the elements of power supply 100. In particular, power supply 200 comprises control circuit 114, switches 104 and 106, inductance 110, and capacitor 112.

The feedback loop is a resistive feedback loop having an adjustable value. More particularly, the feedback loop comprises a resistive block 202 (R), different from resistive block RA of power supply 100, having at least two resistive states. Like block RA, block R is connected between nodes V1 and V2 and comprises resistor R1 connected between nodes V1 and V2. Node V1 is further coupled to ground by resistor R2 in series with a switch 204. Switch 204 is controlled by a binary signal F. Node V1 is also coupled to ground by a resistor RH in series with another switch 206. Switch 206 is controlled by a binary signal $\overline{F}$ corresponding to the signal inverse to signal F. Switches 204 and 206 are for example MOS transistors.

Other examples of resistive blocks will be described hereafter.

Power supply 200 further comprises an AND gate 208 having its inputs connected to output 107 of control circuit 114 and to a node of application of a voltage FB. The output signal of gate 208 controls transistor 106.

The AND gate may optionally be replaced with a circuit capable of maintaining, on order, transistor 106 on.

Power supply 200 further comprises a circuit 210 comprising a counter 212 (COUNTER N). Counter 212 outputs a signal RFB and is incremented, for example, at each rising edge of a clock signal CLK. Clock signal CLK corresponds to the clock signal of control circuit 114 and, in particular, clock signal CLK has the same frequency as input signal D of comparator 120.

Reset input R of counter 212 is coupled to the output of comparator 120 and thus receives signal PWM or a signal representative of signal PWM. In the example of FIG. 2, input R is coupled to the output of comparator 120 by an inverter. However, there may be no such inverter. The counter is thus reset each time signal PWM takes the low value.

Figure 3:
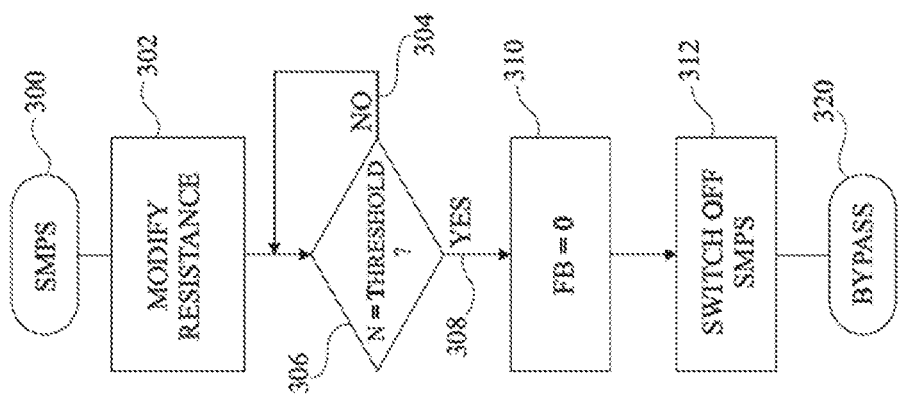
FIG. 3 illustrates an operating mode of the switched-mode power supply of FIG. 2.

FIG. 3 illustrates, in the form of blocks, an operating mode of switched-mode power supply 200 of FIG. 2.

The described operating mode corresponds to the passing from a state 300 (SMPS) where load 103 is powered by switched-mode power supply 200, to a state 320 (BYPASS) in bypass mode, where load 103 is directly powered by the source of application of voltage VBAT, through switch 106 of the converter.

The operating mode comprises a step 302 (MODIFY RESISTANCE) during which the resistance of resistive block R is modified, for example, to switch from a first state to a second state. The characteristics of the first state are selected so that voltage Vout is smaller than voltage VBAT and the characteristics of the second state are selected so that voltage Vout is equal to voltage VBAT (saturation).

For example, in a first state of resistive block R of the example of FIG. 2, transistor 204 is on and transistor 206 is off. Voltage Vout then may be equal to:

$$V\text{out}=V\text{REF}*(1+R1/R2).$$

Reference voltage VREF, as well as resistors R1 and R2, are selected so that voltage Vout is smaller than voltage VBAT.

In a second state of resistive block R of the example of FIG. 2, transistor 204 is off and transistor 206 is on. Voltage Vout then may be equal to:

$$V\text{out}=V\text{REF}*(1+R1/RH).$$

The values of voltage VREF and of resistor R1 may not change from the first state. Resistor RH may be selected to have:

$$V\text{REF}*(1+R1/RH) \geq V\text{BAT}.$$

The value of resistor RH is, in this example, smaller than the value of resistor R2.

More generally, the resistor is modified so that the quotient of the resistance between nodes V1 and V2 to the resistance between node V1 and the ground increases.

Such a state switching of resistive block R causes a progressive increase of voltage V1. Voltage V1 then increases to be greater than or equal to power supply voltage VBAT. Such an increase comprises no current peak risking damaging components.

The state switching of resistor block R causes a variation of the duty cycle of signal PWM. More particularly, the more voltage V1 increases, the more the duty cycle of signal PWM increases, to reach 100% when voltage Vout becomes equal to voltage VBAT.

As long as the duty cycle of signal PWM is not equal to 100%, counter 212 is reset by signal PWM once per period of clock signal CLK. Value N corresponding to the value counted by counter 212 thus cannot reach a threshold (THRESHOLD), the threshold having been selected to be greater than 3, for example, 32. This corresponds to branch 304 (NO) of condition 306 (N=THRESHOLD?).

When the value of voltage Vout takes a value equal to the value of voltage VBAT and the duty cycle of signal PWM becomes equal to 100%, signal PWM becomes constant and the counter is no longer reset. Value N of the counter thus increases to reach the threshold value. This corresponds to branch 308 (YES) of condition 306.

Once the threshold is reached, output signal RFB of counter 212 causes the application of voltage FB to an input of gate 208. Voltage FB is forced to a binary value to keep transistor 106 on. This corresponds to step 310 (FB=0). Thus, whatever the value of the outputs of circuit 122, voltage FB keeps transistor 106 on.

The different elements of power supply 200, except for voltage FB, are then turned off. In particular, control circuit 114 and circuit 210 are turned off, and, e.g., the outputs of driver 122 stop switching. This corresponds to step 312 (SWITCH OFF SMPS).

The system then enters bypass mode 320, that is, load 103 is directly powered by the node of application of voltage VBAT, that is, constantly via switch 106, transistor 106 being kept on by voltage FB.

An advantage of this embodiment is that the increase of voltage Vout has been progressive, in the same way as the increase of voltage V1 caused by the modification of the resistance of the feedback loop.

Figure 4:
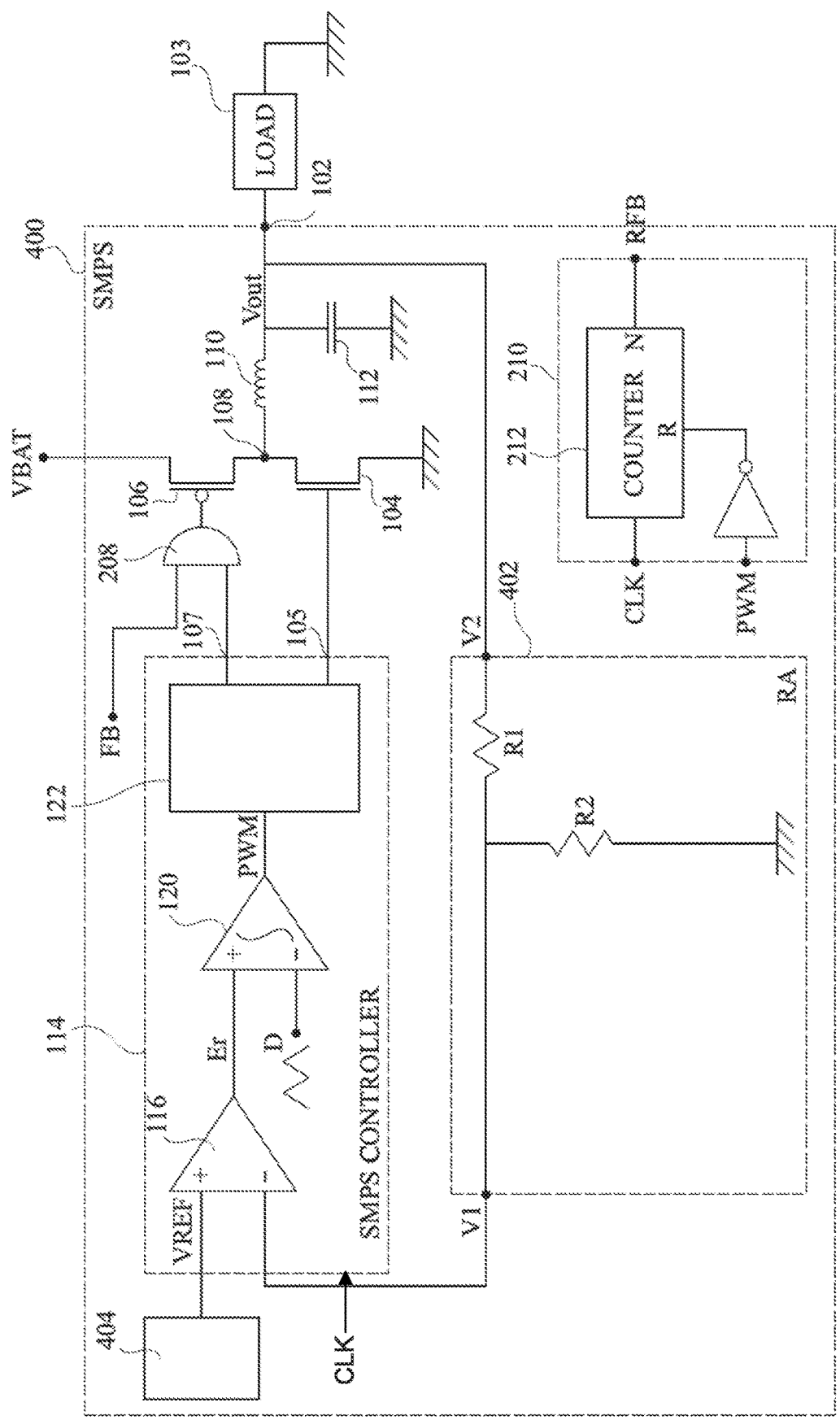
FIG. 4 is a simplified representation of an embodiment of a switched-mode power supply.

FIG. 4 is a simplified representation of an embodiment of a switched-mode power supply 400 powering load 103.

Power supply 400 is a buck converter and comprises elements similar to power supply 200. In particular, power supply 400 comprises control circuit 114, gate 208, transistors 106 and 104, inductance 110, capacitor 112, and circuit 210.

Nodes V1 and V2 are coupled by a resistive block 402. Resistive block 402 for example has a fixed resistance value. Block 402 is for example similar to resistive block RA of FIG. 1.

Figure 8:
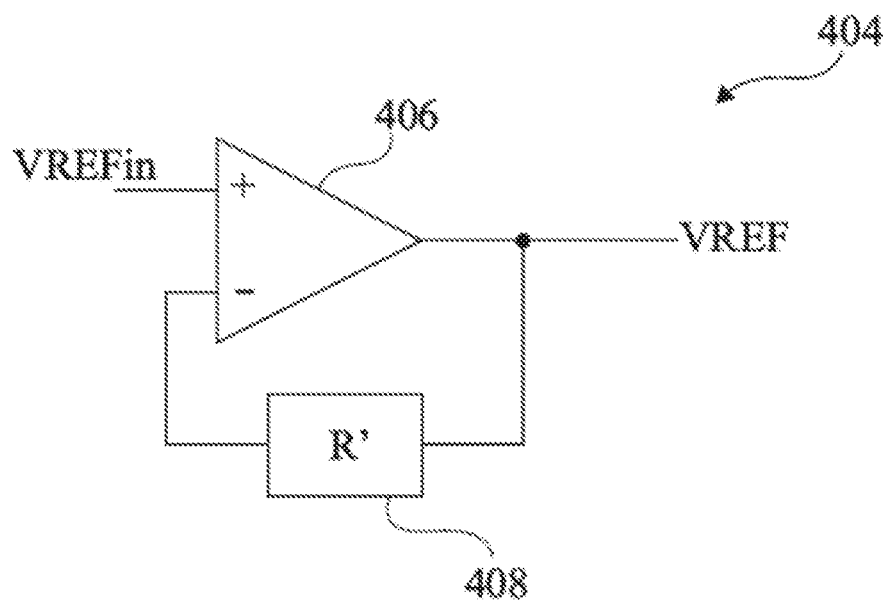
FIGS. 8 and 9 partially show variations of the embodiment of FIG. 4.
Figure 9:
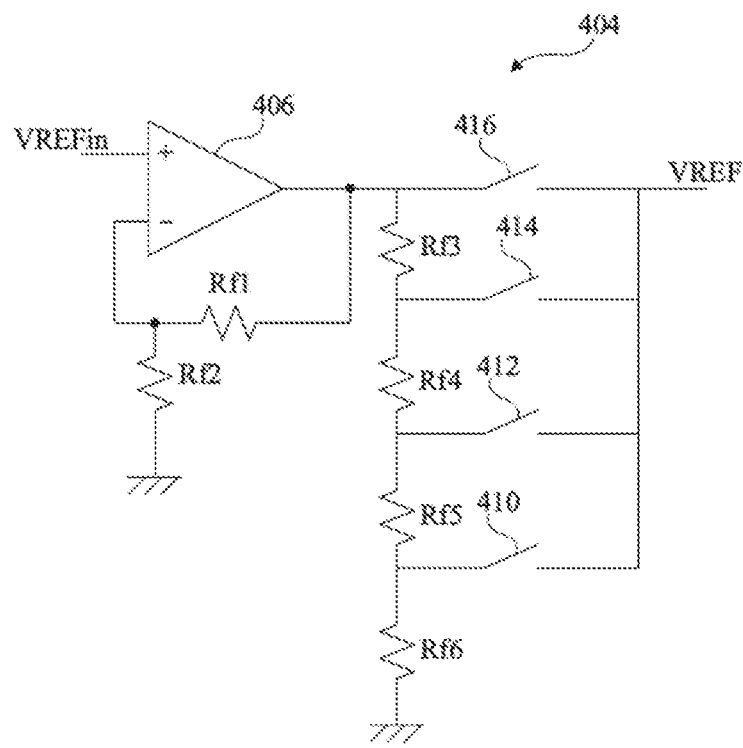

Power supply 400 further comprises a circuit 404 enabling to modify reference voltage VREF. Circuit 404 for example comprises an amplifier circuit having an adjustable gain. Another example of circuit 404 comprises a voltage dividing bridge. Two examples of circuit 404 are illustrated in FIGS. 8 and 9.

The operating mode of power supply 400 is similar to that described in relation with FIG. 3, except for step 302 which is replaced with a step during which reference voltage VREF becomes greater than or equal to the power supply voltage divided by the closed loop gain of the system. The other steps remain identical.

Figure 5:
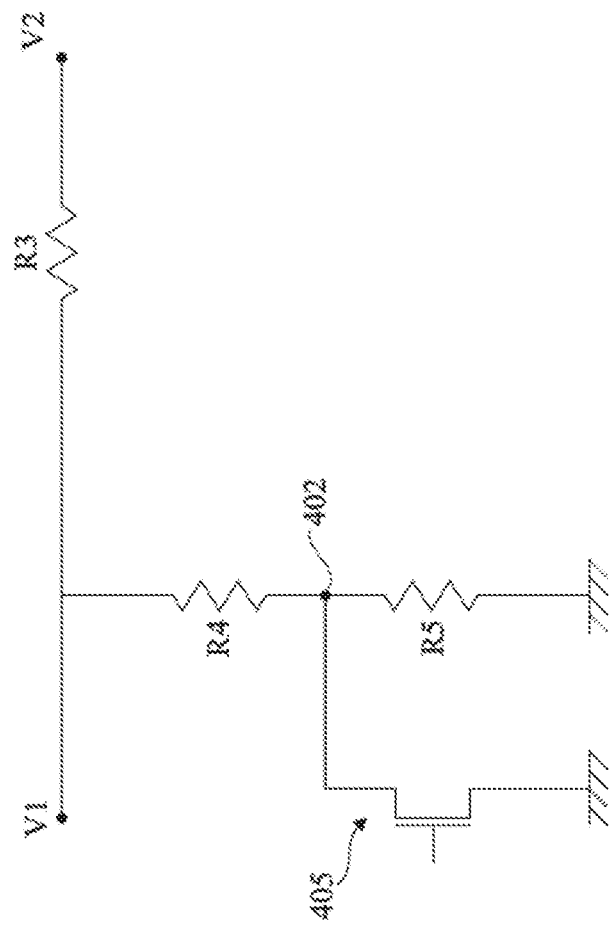
FIGS. 5, 6, and 7 partially show variations of the embodiment of FIG. 2.

FIG. 5 shows a variation of a portion of the embodiment of FIG. 2. More particularly, FIG. 5 shows another example of a resistive block R, located between nodes V1 and V2.

Nodes V1 and V2 are, as in the example of FIG. 2, coupled by a resistor R3, for example, having a resistance equal to that of resistor R1. Node V1 is, further, coupled to ground by two series-connected resistors R4 and R5. Resistor R5 is connected to ground and resistor R4 is connected to node V1. The value of resistance R4 is for example equal to the value of resistance RH of FIG. 2, and resistor R5 is for example selected so that the sum of the values of resistances R4 and R5 are equal to the value of resistance R2.

Connection node 402 of resistors R4 and R5 is further coupled to ground by a switch 405, for example, a MOS transistor.

Thus, the first state of resistive block R corresponds to a state where switch 405 is off. Node V1 is thus coupled to ground by a resistor equivalent to R2. The second state of resistive block R corresponds to a state where switch 405 is on. Node V1 is thus coupled to ground by resistor R4.

Figure 6:
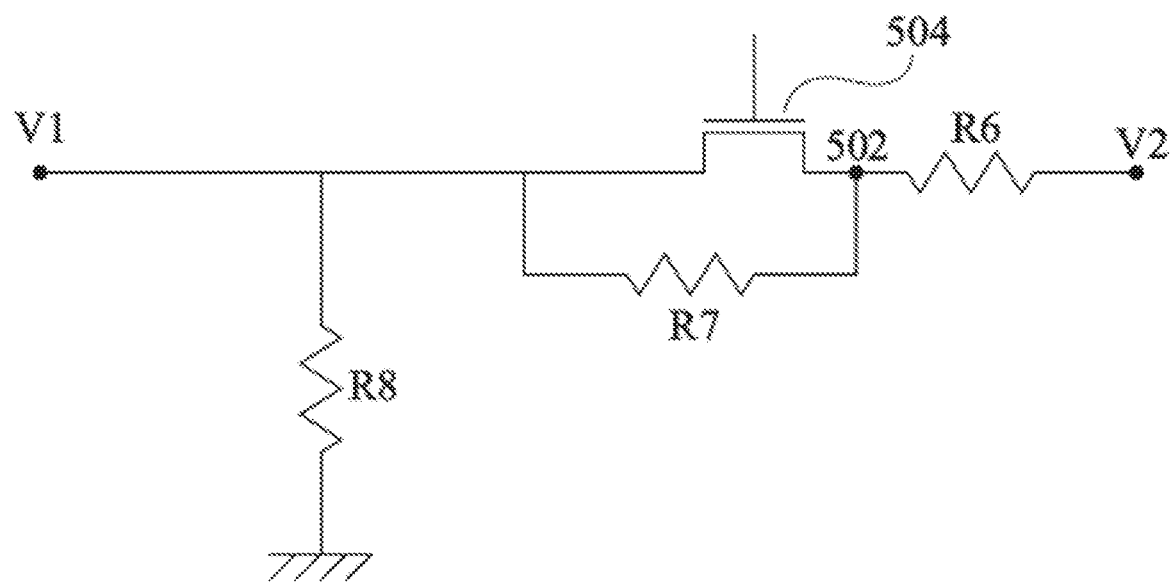

FIG. 6 shows another variation of a portion of the embodiment of FIG. 2. More particularly, FIG. 6 shows another example of a resistive block R, located between nodes V1 and V2.

A resistor R6, for example, having a resistance equal to that of resistor R1, is connected between node V2 and a node 502. A switch 504 and a resistor R7 are connected in parallel between node 502 and node V1. Further, node V1 is coupled to ground by resistor R8, for example, having a resistance equal to that of resistor R2.

The first state of resistive block R corresponds to the state where switch 504 is on. Thus, the resistance between node V1 and node V2 is R6, as in the first state of block R of FIG. 2.

The second state of resistive block R corresponds to the state where switch 504 is off. Thus, the resistance between nodes V1 and V2 is R6+R7 and is thus greater than the resistance between node V1 and node V2 of the first state.

The value of resistance R7 is selected so that voltage Vout=VREF*(1+((R6+R7)/R8) is greater than or equal to, preferably greater than, voltage VBAT.

Figure 7:
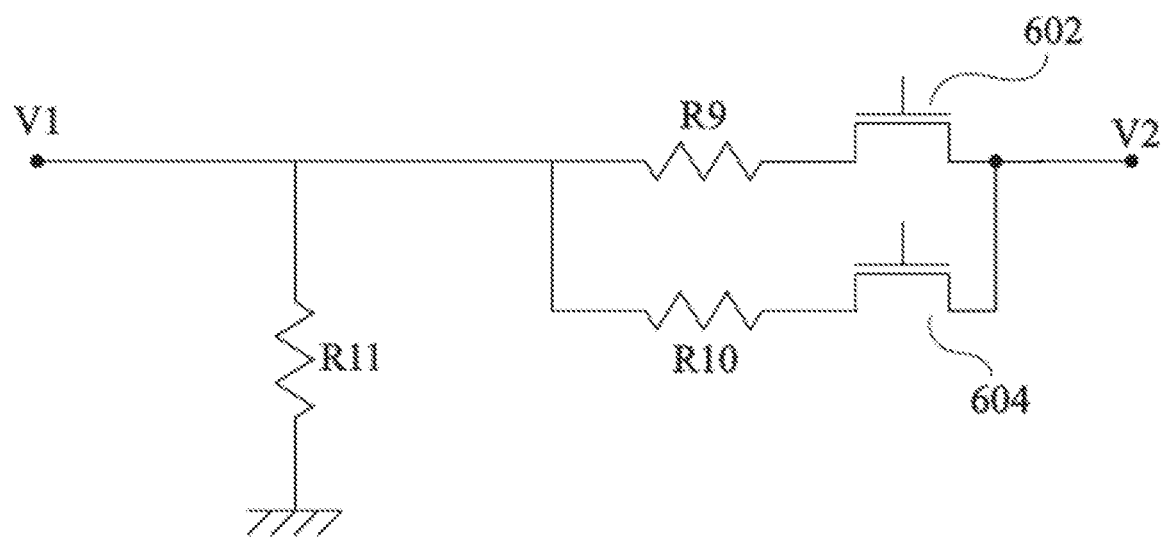

FIG. 7 shows another variation of a portion of the embodiment of FIG. 2. More particularly, FIG. 7 shows another example of a resistive block R, located between nodes V1 and V2.

Nodes V1 and V2 are connected by a switch 602, for example, a transistor, in series with a resistor R9, for example, having a resistance equal to that of resistor R1. Nodes V1 and V2 are also connected by a switch 604, for example, a transistor, in series with a resistor R10. Switch 602 and resistor R9 are thus in parallel with switch 604 and resistor R10. Node V1 is also coupled to ground by resistor R11, for example, having a resistance equal to that of resistor R2.

The first state of resistive block R corresponds to the state where switch 602 is on and switch 604 is off. Thus, the resistance between node V1 and node V2 is R9.

The second state of resistive block R corresponds to the state when switch 602 is off and switch 604 is on. Thus, the resistance between node V1 and node V2 is R10.

The value of resistance R10 is selected to be greater than R9 and so that voltage Vout=VREF*(i+R10/R11) is greater than or equal to, preferably greater than, VBAT.

FIGS. 8 and 9 partially show variations of the embodiment of FIG. 4. More particularly, FIGS. 8 and 9 show examples of circuits 404. The circuits 404 of FIGS. 8 and 9 receive as an input a voltage VREFin, for example substantially constant, and output reference voltage VREF.

In the example of FIG. 8, circuit 404 comprises an operational amplifier 406 receiving at its positive input (+) voltage VREFin and outputting voltage VREF. The negative input (−) of operational amplifier 406 is coupled to its output by a resistive block 408 (R') having an adjustable resistance. Block 408 for example has a structure similar to a resistive block R such as described in relation with FIG. 2, 5, 6, or 7.

In the example of FIG. 9, circuit 404 similarly comprises operational amplifier 406 receiving at its positive input (+) voltage VREFin. The negative input (−) of operational amplifier 406 is coupled to its output by a resistor Rf1, the negative input of operational amplifier 406 being coupled to ground by a resistor Rf2. The output of the operational amplifier is also coupled to ground by a resistive block having an adjustable resistance. More particularly, the output of the operational amplifier is coupled to ground by four series-connected resistors Rf3, Rf4, Rf5, and Rf6. In practice, the series-connected resistors may come by any number. Each node connecting two of the four series-connected resistors is coupled to the output of circuit 404 by a switch 410, 412, or 414. Further, the output of the operational amplifier is coupled to the output of circuit 404 by a switch 416. The states of switches 410, 412, 414, and 416 are modified to adjust the value of voltage VREF.

Figure 10:
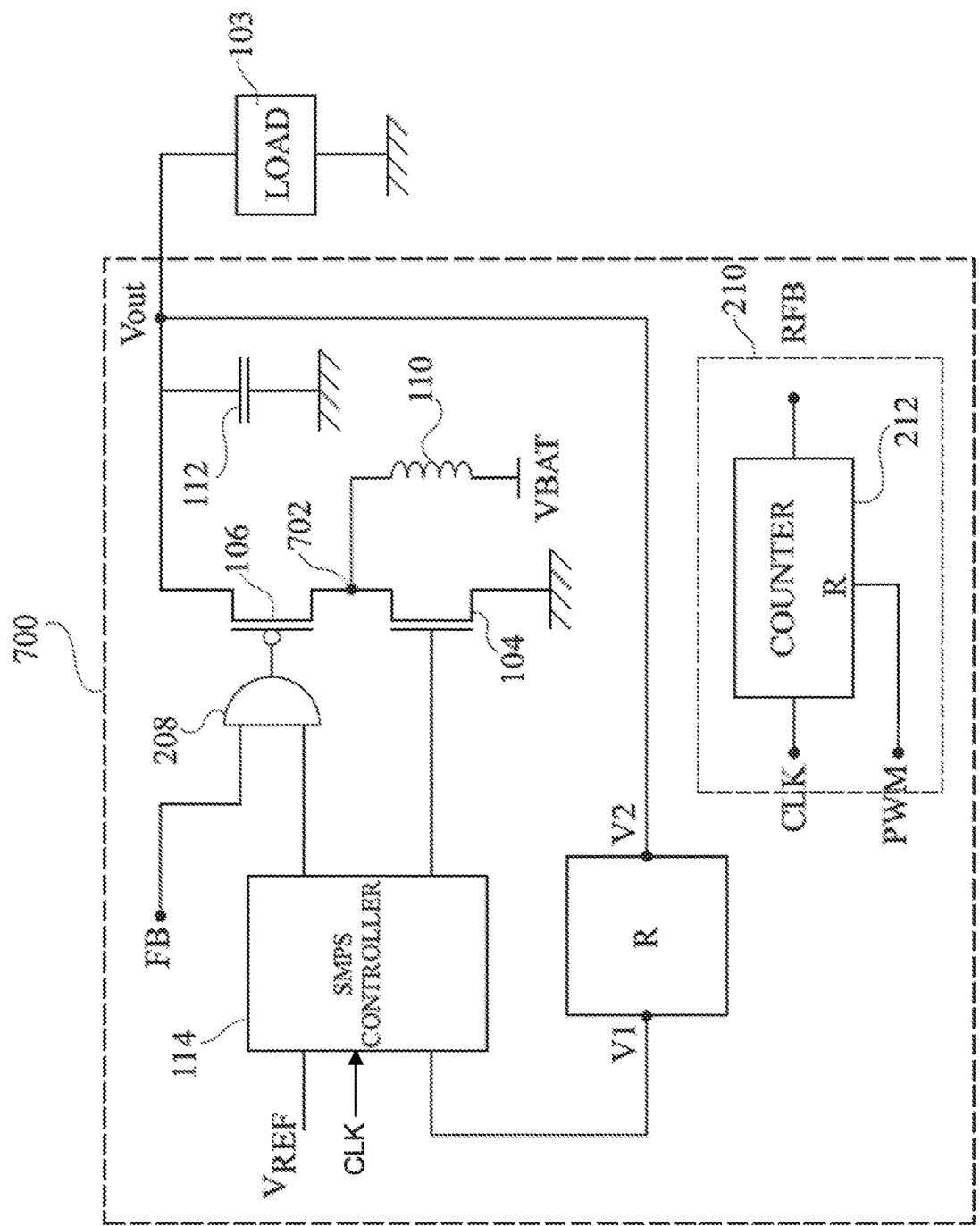
FIG. 10 is a simplified representation of another embodiment of a switched-mode power supply.

FIG. 10 is a simplified representation of another embodiment of a switched-mode power supply 700. Power supply 700 is here a boost power supply, that is, output voltage Vout is greater than power supply voltage VBAT.

Power supply 700 comprises, like power supply 200 of FIG. 2, the control circuit 114 receiving reference voltage VREF and the voltage of node V1. Power supply 700 further comprises a resistive block R, such as those described in FIGS. 2, 5, 6, and 7, between nodes V1 and V2, node V2 corresponding to the node at which output voltage Vout is available. The power supply further comprises transistors 104 and 106, series-connected between node V2 and the ground. More particularly, transistor 106 is connected between node V2 and a node 702 and transistor 104 is connected between node 702 and the ground. Transistor 104 is controlled by control circuit 114. Transistor 106 is controlled, as in FIG. 2, by the output signal of gate 208, receiving as an input a signal FB and an output signal of control circuit 114.

Node 702 is coupled to the node of application of voltage VBAT by inductance no. Node V2 is, as in FIGS. 1 and 2, coupled to ground by capacitor 112 and by load 103.

Power supply 700 further comprises circuit 210 comprising counter 212.

Power supply 700 may operate in bypass mode, like the previously-described power supplies, which allows an operation at lower noise. In bypass mode, transistor 106 is kept on, transistor 104 is kept off and control circuit 114 may be turned off.

The transition between the mode where the load is powered by the switched-mode power supply and the bypass mode is similar to the succession of steps described in relation with FIG. 3.

During step 302 of modification of resistance R, the quotient of the resistance between nodes V1 and V2 to the resistance between node V1 and the ground decreases. The characteristics of such a decrease, that is, for example, the resistance values, are selected so that the feedback voltage becomes progressively substantially smaller than or equal to the power supply voltage and that output voltage Vout becomes progressively substantially equal to VBAT.

The other steps of the operating mode described in relation with FIG. 3 are not significantly modified.

According to another embodiment of a boost converter, resistive block R is for example identical to resistive block RA of FIG. 1, and power supply 700 comprises a circuit identical or similar to circuit 404 enabling to modify reference voltage VREF. Step 302 is replaced with a step during which reference voltage VREF becomes smaller than or equal to the power supply voltage divided by the closed loop gain of the system. The other steps remain identical.

Specific embodiments have been described. Various alterations, modifications, and improvements will readily occur to those skilled in the art.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A switched-mode power supply comprising:
   a half-bridge comprising:
      an output node,
      a first transistor coupled between a first terminal and the output node, and
      a second transistor coupled between the output node and a second terminal, the first terminal configured to receive a first voltage, and the second terminal configured to receive a second voltage lower than the first voltage;
   a controller comprising:
      a driver configured to receive a pulse-width modulation (PWM) signal, the driver having an output coupled to a control terminal of the first transistor, the driver configured to cause the first transistor to turn on for a time that is proportional to a duty cycle of the PWM signal, a first input configured to receive a reference voltage, a comparator having a first input coupled to the first input of the controller and a second input coupled to the output node, and an error amplifier having a first input coupled to an output of the comparator, a second input configured to receive a periodic signal, and an output configured to generate the PWM signal; and a first circuit coupled between the output of the driver and the control terminal of the first transistor, wherein the first circuit is configured to maintain the first transistor on when the duty cycle of the PWM signal is substantially 100%, wherein the switched-mode power supply is a buck converter having a feedback network coupled between the output node and the second input of the comparator, the reference voltage being capable of taking a value greater than or equal to the first voltage divided by a closed loop gain of the buck converter, the closed loop gain being based on the feedback network.

2. The switched-mode power supply of claim 1, further comprising a second circuit configured to detect whether the duty cycle of the PWM signal is substantially equal to 100%.

3. The switched-mode power supply of claim 1, wherein the first circuit comprises an AND gate.

4. The switched-mode power supply of claim 1, further comprising a reference voltage generator coupled to the first input of the controller, the reference voltage generator configured to generate the reference voltage, wherein the reference voltage generator is capable of adjusting a level of the reference voltage.

5. The switched-mode power supply of claim 4, wherein the reference voltage generator comprises an amplifier and a resistive feedback loop coupled between an output of the amplifier and an input of the amplifier, the resistive feedback loop having an adjustable resistance.

6. The switched-mode power supply of claim 4, wherein the reference voltage generator comprises an amplifier, a resistive feedback loop coupled between an input of the amplifier an output of the amplifier, and a resistive network coupled between the output of the amplifier and the second terminal, the resistive network having an adjustable resistance.

7. The switched-mode power supply of claim 1, wherein the feedback network comprising a first resistor and a second resistor.

8. The switched-mode power supply of claim 7, wherein the feedback network further comprises a third transistor coupled between the first resistor and the second terminal, a fourth transistor coupled between the second resistor and the second terminal, and a third resistor coupled between the first resistor and the third transistor.

9. The switched-mode power supply of claim 7, wherein the first resistor is coupled between the output node and the controller, and the second resistor is coupled between the controller and a second node, the feedback network further comprising a third transistor coupled between the second node and the second terminal, and a third resistor coupled between the second node and the second terminal.

10. The switched-mode power supply of claim 7, wherein the first resistor is coupled between the output node and the controller, and the second resistor is coupled between the controller and the second terminal, the feedback network further comprising a third transistor coupled between the first resistor and the controller, and a third resistor coupled between the first resistor and the controller.

11. The switched-mode power supply of claim 7, wherein the first resistor is coupled between the output node and the controller, and the second resistor is coupled between the controller and the second terminal, the feedback network further comprising a third transistor coupled in series with the first resistor, a third resistor coupled between the output node and the controller, and a fourth transistor coupled in series with the third resistor.

12. A switched-mode power supply comprising:

a half-bridge comprising:

an output node, a first transistor coupled between a first terminal and the output node, and a second transistor coupled between the output node and a second terminal, the first terminal configured to receive a first voltage, and the second terminal configured to receive a second voltage lower than the first voltage;

a controller comprising a driver configured to receive a pulse-width modulation (PWM) signal, the driver having an output coupled to a control terminal of the first transistor, the driver configured to cause the first transistor to turn on for a time that is proportional to a duty cycle of the PWM signal;

a first circuit coupled between the output of the driver and the control terminal of the first transistor, wherein the first circuit is configured to maintain the first transistor on when the duty cycle of the PWM signal is substantially 100%; and a second circuit configured to detect whether the duty cycle of the PWM signal is substantially equal to 100%, wherein the controller further comprises an error amplifier having a first input coupled to the output node, a second input configured to receive a periodic signal having a first frequency, and an output configured to generate the PWM signal, wherein the second circuit comprises a counter having a first input configured to receive a clock signal having a second frequency substantially equal to the first frequency, a second input coupled to the output of the error amplifier, and an output configured to generate a first control signal, and wherein the first circuit comprises a first input configured to receive a second control signal indicative of whether the duty cycle of the PWM signal is substantially 100%, the second control signal being based on the first control signal.

13. The switched-mode power supply of claim 12, further comprising a feedback network with adjustable resistance, wherein the second input of the counter is a reset input, and wherein the switched-mode power supply is configured to:

adjust a resistance of the feedback network from a first resistance to a second resistance; and when a count of the counter reaches a first threshold, adjust the second control signal to indicate that the PWM signal is substantially equal to 100%.

14. The switched-mode power supply of claim 13, wherein the driver has a second output coupled to a control terminal of the second transistor, and wherein the switched-mode power supply is further configured to, after adjusting the second control signal, stop switching the output and the second output of the driver.

15. The switched-mode power supply of claim 13, wherein the first threshold is equal or higher than 3.

16. The switched-mode power supply of claim 12, wherein the second circuit further comprises an inverter coupled between the second input of the counter and the output of the error amplifier.

17. The switched-mode power supply of claim 12, further comprising an inductor coupled to the output node.

18. The switched-mode power supply of claim 17, further comprising a load coupled to the inductor.

19. The switched-mode power supply of claim 12, further comprising a reference voltage generator coupled to the controller, the reference voltage generator configured to generate a reference voltage, wherein the reference voltage generator is capable of adjusting a level of the reference voltage.

20. A switched-mode power supply comprising:
   a half-bridge comprising:
      an output node,
      a first transistor coupled between a first terminal and the output node, and
      a second transistor coupled between the output node and a second terminal, the first terminal configured to receive a first voltage, and the second terminal configured to receive a second voltage lower than the first voltage;
   a controller comprising:
      a driver configured to receive a pulse-width modulation (PWM) signal, the driver having an output coupled to a control terminal of the first transistor, the driver configured to cause the first transistor to turn on for a time that is proportional to a duty cycle of the PWM signal,
      a first input configured to receive a reference voltage,
      a comparator having a first input coupled to the first input of the controller and a second input coupled to the output node, and
      an error amplifier having a first input coupled to an output of the comparator, a second input configured to receive a periodic signal, and an output configured to generate the PWM signal; and
   a first circuit coupled between the output of the driver and the control terminal of the first transistor, wherein the first circuit is configured to maintain the first transistor on when the duty cycle of the PWM signal is substantially 100%, wherein the switched-mode power supply is a boost converter having a feedback network coupled between the output node and the second input of the comparator, the reference voltage being capable of taking a value smaller than or equal to the first voltage divided by a closed loop gain of the boost converter, the closed loop gain being based on the feedback network.

21. The switched-mode power supply of claim 20, further comprising a second circuit configured to detect whether the duty cycle of the PWM signal is substantially equal to 100%, the second circuit comprising a counter having a first input configured to receive a clock signal having a frequency substantially equal to a frequency of the periodic signal, a second input coupled to the output of the error amplifier, and an output configured to generate a first control signal, and wherein the first circuit comprises a first input configured to receive a second control signal indicative of whether the duty cycle of the PWM signal is substantially 100%, the second control signal being based on the first control signal.

22. A switched-mode power supply comprising:
   a half-bridge comprising:
      an output node,
      a first transistor coupled between a first terminal and the output node, and
      a second transistor coupled between the output node and a second terminal, the first terminal configured to receive a first voltage, and the second terminal configured to receive a second voltage lower than the first voltage;
   a controller comprising:
      a driver configured to receive a pulse-width modulation (PWM) signal, the driver having an output coupled to a control terminal of the first transistor, the driver configured to cause the first transistor to turn on for a time that is proportional to a duty cycle of the PWM signal,
      an error amplifier having a first input coupled to the output node, a second input configured to receive a periodic signal having a first frequency, and an output configured to generate the PWM signal;
   a first circuit coupled between the output of the driver and the control terminal of the first transistor, wherein the first circuit is configured to maintain the first transistor on when the duty cycle of the PWM signal is substantially 100%; and
   a second circuit configured to detect whether the duty cycle of the PWM signal is substantially equal to 100%, the second circuit comprising a counter having a first input configured to receive a clock signal having a second frequency substantially equal to the first frequency, a second input coupled to the output of the error amplifier, and an output configured to generate a first control signal indicative of a count, wherein the first circuit comprises a first input configured to receive a second control signal indicative of whether the duty cycle of the PWM signal is substantially 100%, the second control signal being based on the first control signal, and wherein the first circuit is configured to turn on the first transistor and maintain on the first transistor when the count reaches a first threshold.

23. The switched-mode power supply of claim 22, wherein the driver has a second output coupled to a control terminal of the second transistor, and wherein the driver is configured to stop switching the second output of the driver when the count reaches the first threshold.

24. The switched-mode power supply of claim 23, wherein the controller further comprises a first input configured to receive a reference voltage, and a comparator having a first input coupled to the first input of the controller, a second input coupled to the output node, and an output coupled to the first input of the error amplifier, and wherein the switched-mode power supply is a boost converter having a feedback network coupled between the output node and the second input of the comparator, the reference voltage being capable of taking a value smaller than or equal to the first voltage divided by a closed loop gain of the boost converter, the closed loop gain being based on the feedback network.

25. A switched-mode power supply comprising:
   a half-bridge comprising:
      an output node,
      a first transistor coupled between a first terminal and the output node, and
      a second transistor coupled between the output node and a second terminal, the first terminal configured to receive a first voltage, and the second terminal configured to receive a second voltage lower than the first voltage;
   a controller comprising:
      a driver configured to receive a pulse-width modulation (PWM) signal, the driver having a first output coupled to a control terminal of the first transistor, and a second output coupled to a control terminal of the second transistor, the driver configured to cause the first transistor to turn on for a time that is proportional to a duty cycle of the PWM signal, an error amplifier having a first input coupled to the output node, a second input configured to receive a periodic signal having a first frequency, and an output configured to generate the PWM signal;

a first circuit coupled between the output of the driver and the control terminal of the first transistor, wherein the first circuit is configured to maintain the first transistor on when the duty cycle of the PWM signal is substantially 100%;

a second circuit configured to detect whether the duty cycle of the PWM signal is substantially equal to 100%, the second circuit comprising a counter having a first input configured to receive a clock signal having a second frequency substantially equal to the first frequency, a reset input coupled to the output of the error amplifier, and an output configured to generate a first control signal indicative of a count, wherein the first circuit comprises a first input configured to receive a second control signal indicative of whether the duty cycle of the PWM signal is substantially 100%, the second control signal being based on the first control signal; and a feedback network with adjustable resistance, wherein the switched-mode power supply is configured to:

adjust a resistance of the feedback network from a first resistance to a second resistance; and when the count reaches a first threshold, adjust the second control signal to indicate that the PWM signal is substantially equal to 100%, wherein the first threshold is equal or higher than 3.

* * * * *